2,642,109

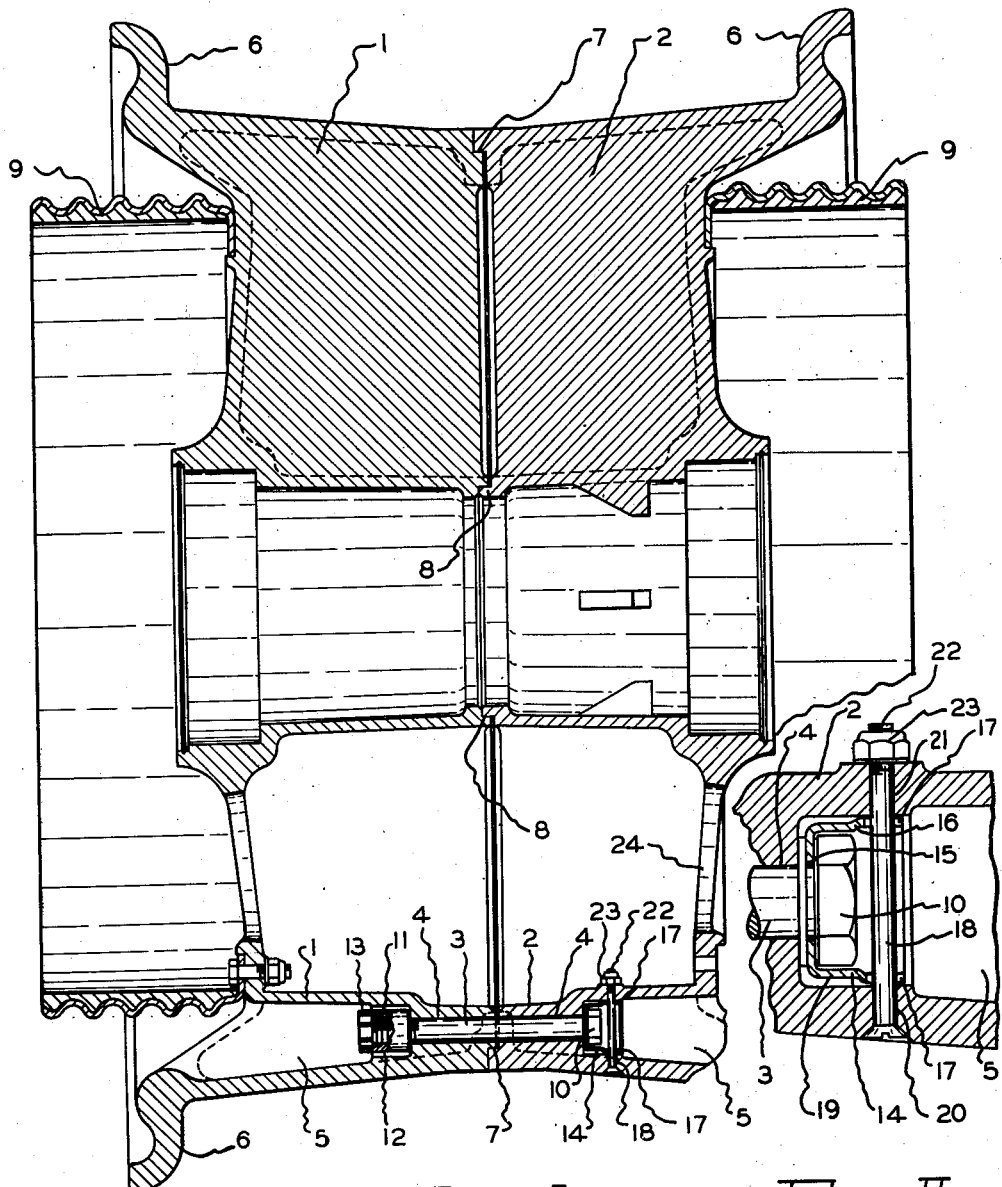

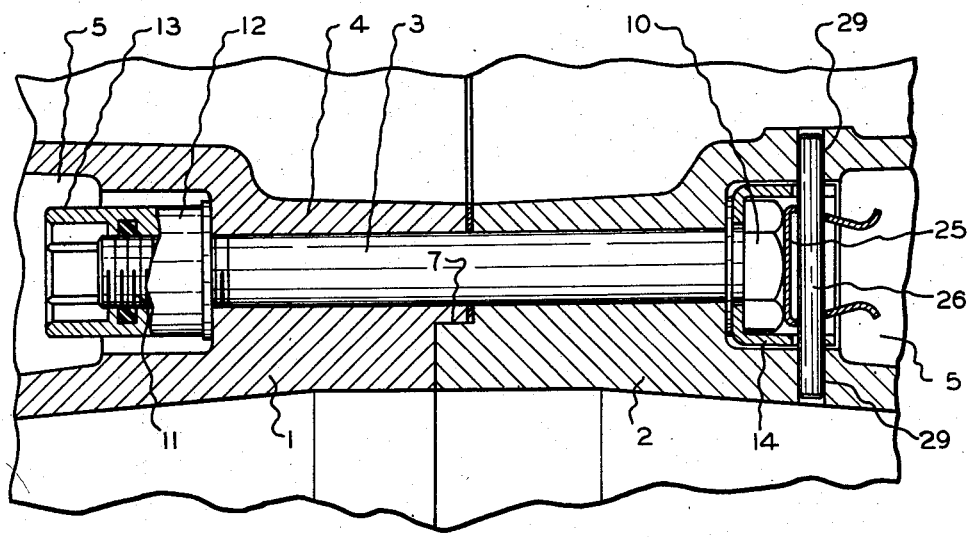
FIG. III.
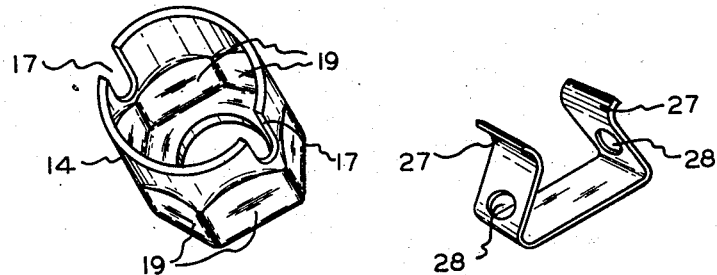
FIG. IV.   FIG. V.
Inventor
CHARLES HOLLERITH
By Beaman & Patch
ATTORNEY Patented June 16, 1953

UNITED STATES PATENT OFFICE 2,642,109

LOCKED BOLT

Charles Hollerith, Jackson, Mich., assignor, by mesne assignments, to The B. F. Goodrich Company, Akron, Ohio, a corporation of New York Application December 11, 1947, Serial No. 790,945

2 Claims. (Cl. 151—62)

This invention relates to vehicle wheels of the kind which are built-up from separately made sections, which form the opposite sides of the wheel and combine to complete the wheel rim and which are adapted to be connected together in laterally adjacent relationship to complete the desired wheel structure. In particular, the invention is concerned with wheel constructions of this kind which are intended for use on aircraft, it being understood however that the wheel construction provided may be employed on vehicles generally.

An object of the invention is to provide for the connecting of the adjacent wheel section together, or the disconnecting thereof, in a rapid and efficient manner by a single operator.

The invention also has for its object to provide a simple and quick action means for connecting or disconnecting adjacent wheel sections, in the form of simple through bolts which are held by clips against turning from one end thereof within one wheel section while nuts, preferably in the form of nuts having internal hexagonal sockets for actuating the same, are rotatively engaged or disengaged with respect to the screwed ends of the bolts located within the other wheel section.

These and other objects and advantages of the invention will be apparent from a consideration of the following description and claims with reference to the accompanying drawings in which:

Fig. I is a vertical section of a wheel construction embodying one form of the invention, Fig. II is an enlarged detail view of the cup member employed in the construction shown in Fig. I in order to hold one of the securing bolts against turning, Fig. III is a fragmentary sectional view of a modified construction of the quick-action connecting means, Fig. IV is a detail perspective view of a cup member employed to prevent turning movement of a securing bolt, and Fig. V is a detail perspective view of the spring clip employed in the modified construction according to Fig. III.

In carrying the invention into effect in one convenient manner as illustrated in the drawings and referring first to Figs. I and II a wheel construction is shown therein as composed of two adjacent sections 1 and 2 which are secured together in laterally adjacent relationship to complete the desired wheel structure by means of a series of transversely extending through bolts 3 mounted at circumferentially spaced intervals within axially registered transverse bores 4 formed in the two wheel sections.

These bores 4 are open at their outer ends to enlarged transversely extending cavities 5 in the wheel sections, each of which is formed with a tire retaining flange 6 and with rabbeted cylindrical portions, as indicated at 7 and 8, by which the wheel sections are properly located with respect to one another in the assembled condition thereof. Each wheel section is also shown as being fitted on the outer side wall with a brake drum 9.

Each through bolt 3, only one of which is shown but all of which are identical, has a hexagonal head 10 at one end and is screw-threaded at its opposite end, as indicated at 11, for the reception of a nut 12, which is preferably of the type, as shown, which has an end skirt portion 13, the hollow interior surface of which is formed to receive a bar or rod for rotating the nut and is accordingly readily accessible for such purpose by the insertion of a bar or rod into the cavities 5. At its opposite end each bolt is provided with a cup member 14 having a central opening 15 in its base for the passage of the bolt and the open end of the skirt portion 16 of which extends beyond the bolt head 10 and is formed with diametrical slots 17 through which a screw 18 is capable of being passed to hold this cup, and hence the bolt 4, against rotation. The inner portion 19 of the cup is squared to resist rotation of the bolt head 10 and the screw 18 is secured upon the wheel section 2 so as to extend transversely through the corresponding cavity 5 in a direction perpendicular to the direction of the bolt 3. As shown particularly in Fig. II the screw 18 is inserted through a hole 20 in the outside wall of the cavity 5 and is passed at its inner end through an aligned hole 21 in the inner wall of the cavity so that the screw-threaded end 22 of the screw may receive a securing nut 23, accessible through a transverse opening 24 on the outside wall of the hollowed-out wheel section 2.

To assemble the wheel sections therefore, and assuming that the bolts 3 have been inserted in the bores 4 of the wheel section 2 and the cups 14 have been applied and secured in position as described, it is merely necessary to bring the wheel sections together to properly align the bolts 3 with respect to the bores 4 in the other wheel section 1, so that the bolt ends projecting from the wheel section 2 can be inserted within these bores of the wheel section 1 in position for the application of the securing nuts 12. These can be readily applied by a single operator, since the bolts are themselves held against rotation by the cups 14 and the operator merely has to insert the nut operating tool through the cavities 5 in order to perform the desired tightening operation, which is capable of being performed rapidly as also is the nut removing operation when it is desired to dismantle the wheel sections.

Referring to Fig. III, IV and V, in which the same reference numerals have been applied to denote the same parts as are shown in Figs. I and II, the means employed to prevent the bolts from turning consists of the cups 14 as before but instead of relying upon the use of a screw 18 and nut 23 for securing each bolt head against rotation, a simple spring clip, indicated generally at 25, is employed in association with a simple or plain cross pin 26. This clip has opposite spring arms 27 which are normally stressed toward one another and have axially aligned openings 28 through which the cross pin 26 is capable of extending with a slight clearance fit, which is taken up on one side by the spring action exerted by the arms 27 when the latter are freed from a spread apart position necessary to permit the cross pin 26 to be inserted at its ends into the openings in the opposite walls of the corresponding cavity 5. It will be appreciated that as the screw 18 or the pin 26 is disposed in the path of the bolt head the bolt is restrained against longitudinal displacement, such as might otherwise occur when the nut is applied to its opposite end.

Having thus described my invention what I claim is:

1. In combination with wheel structure having a hole defined therein to receive a bolt, a cavity defined in said structure into which said hole opens, a bolt in said hole having its head disposed in said cavity, of a socket member in said cavity in which said head is disposed and held against relative rotation, an opening defined in said structure and extending into said cavity, a locking member located in said opening and extending into said cavity, a portion of said socket engaged by said locking member to prevent rotation of said socket in said cavity, said locking member being in the form of a pin bridging said cavity, said opening being in the form of opposed holes defined in said structure in which said pin is disposed, and releasable locking structure disposed in said cavity and engaging with said pin to prevent unintentional axial displacement thereof.

2. A bolt head holding structure assembly comprising structure having a hole defined therein to receive the shank of the bolt and a cavity defined therein to receive the head of the bolt, a bolt having a shank disposed in said hole and its head disposed in said cavity, a socket member located in said cavity and embracing the head of said bolt to prevent relative rotation between said socket and said bolt head, a cross hole opening into said cavity and defined in said structure, a portion of said socket extending beyond said bolt head and having an opening therein aligned with said cross hole, a removable pin disposed in said cross hole and bridging said cavity and socket through the opening in said socket to prevent relative rotation between said socket and said structure wherein said releasable locking means engages with the bridging portion of said pin within said socket to prevent accidental axial displacement of said pin.

CHARLES HOLLERITH.

References Cited in the file of this patent
UNITED STATES PATENTS

| Number | Name | Date |
|---|---|---|
| 620,812 | Ward | Mar. 7, 1899 |
| 1,166,220 | Jeannot | Dec. 28, 1915 |
| 1,869,318 | Swain | July 26, 1932 |
| 2,105,317 | Frank | Jan. 11, 1938 |
| 2,407,423 | Hollerith | Sept. 10, 1946 |
| 2,431,735 | Cyr | Dec. 2, 1947 |
| 2,544,387 | Kerr | Mar. 6, 1951 |